May 16, 1967     E. I. UNGLESBY     3,319,326

PREASSEMBLED PISTON AND PISTON ROD BEARING COMBINATION

Filed Feb. 8, 1965

INVENTOR.
ELMER I. UNGLESBY

BY *Kimmel, Crowell & Weaver*
ATTORNEYS.

United States Patent Office 3,319,326
Patented May 16, 1967

3,319,326
PREASSEMBLED PISTON AND PISTON ROD
BEARING COMBINATION
Elmer Isaac Unglesby, 6701 Stockton Blvd.,
Sacramento, Calif. 95823
Filed Feb. 8, 1965, Ser. No. 430,969
2 Claims. (Cl. 29—271)

ABSTRACT OF THE DISCLOSURE

A preassembled piston and piston rod assembly having a pair of tools secured to the connecting rod for maintaining a bearing in position therein while said assembly is being inserted in an internal combustion engine is disclosed.

This invention relates to an assembly tool for the retention of internal components during assembly and disassembly and more particularly to a tool for the assembly or disassembly of a piston, connecting rod and crankshaft bearing and associated connecting bolts to or from a crankshaft.

Applicant is aware that there are devices known to the prior art for facilitating the assembly or disassembly of piston rods and connecting rods, or connecting rods and crankshafts.

However, a problem in the assembly of connecting rods to crankshafts which heretofore has been unrecognized by the prior art is the difficulty of preventing the crankshaft bearing associated with the connecting rod from falling loose during disassembly for grinding the piston or other purpose, and during replacement of the bearing and connecting rod on the crankshaft. This difficulty can lead to greater problems at a later date since workmen may sometimes fail to clean the bearing properly after it has fallen on the floor of the work area, and the retention of any grit or foreign matter on the bearing is obviously detrimental to the crankshaft and crankshaft bearing after assembly is complete and the engine is run.

Another problem related to the assembly of a connecting rod and bearing to a crankshaft is that difficulty is encountered in placing the connecting bolts in their respective holes because of the cramped working conditions. The result is that these bolts joining the upper and lower semicircles of the connecting rod may similarly be dropped, requiring cleaning of the bolt, or failing this, jamming of dirty bolt when the nut is positioned thereon. Similar related problems occur during the disassembly of the connecting rod from the crankshaft.

Accordingly, a primary object of this invention is to provide a preassembled piston and piston rod assembly having specially designed means holding a bearing in the piston rod while the assembly is being inserted into position into an internal combustion engine.

Another object of this invention resides in the provision of a means for preassembling the connecting rod, upper crankshaft bearing, and the bolts needed to assemble the connecting rod to the crankshaft so that the preassembled components may be readily attached to the crankshaft.

Still another object of this invention is the provision of means for preventing the crankshaft bearing and the connecting rod bolts from coming loose and falling during the assembly of the connecting rod to the crankshaft.

Another object of the present invention is the provision of means for facilitating the assembly and disassembly of connecting rods to crankshafts without danger of marring or damaging any of the engine components or the crankshaft.

Figure 1:
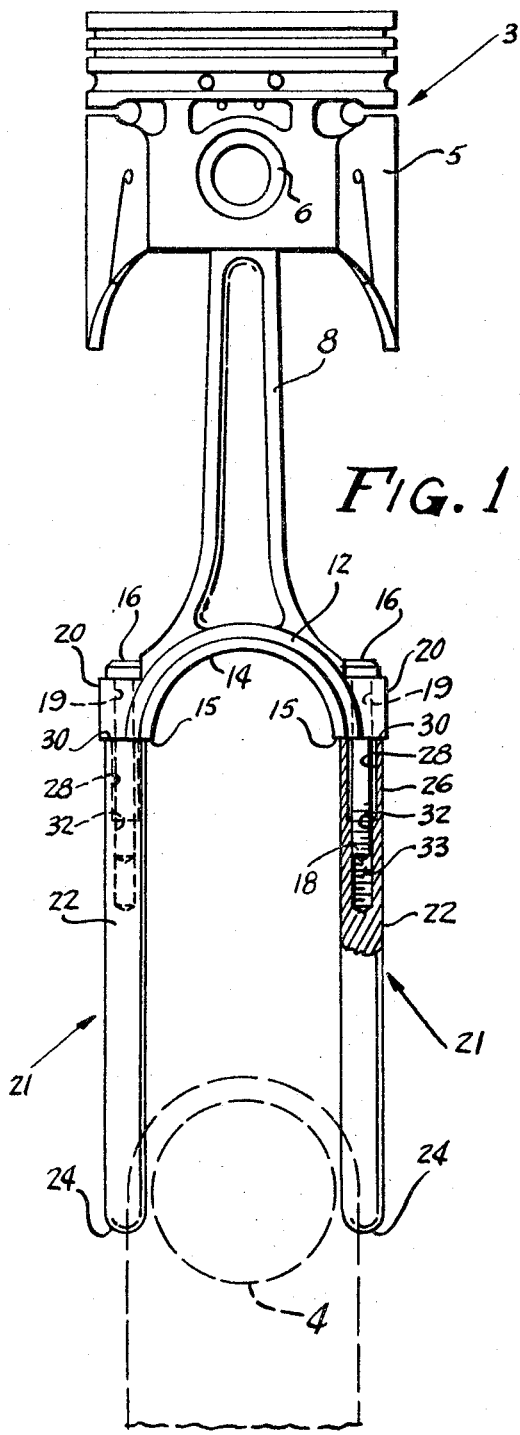
Figure 2:
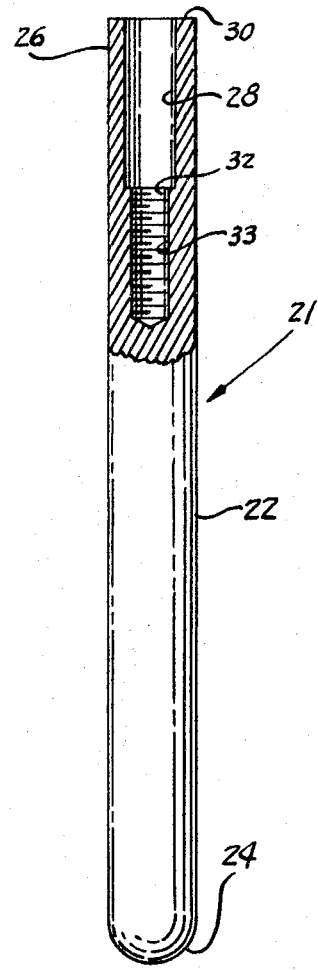

These and other objects and advantages of this invention will become apparent in the more detailed description following, and shown in the commpanying drawings wherein:

FIGURE 1 is a view of the preassembly unit along the longitudinal axis of a crankshaft onto which a piston, connecting rod, and bearing preassembly are adapted to be secured, showing a pair of tools constructed in accordance with the instant invention, all being shown partly in section; and FIGURE 2 is a view partly in section and partly in elevation of one form of tool embodying the present invention.

Similar reference characters refer to similar parts throughout the several views of the drawing.

In FIGURE 1 the preassembly unit, generally indicated at 3 is shown about to be affixed to a crankshaft 4. The preassembly unit 3 comprises, illustratively, a piston 5 for a conventional internal combustion engine pivotally connected by a pin 6 to a connecting rod generally indicated at 8. The connecting rod 8 is of conventional make and includes a bifurcated concaved portion 12 at the lower end thereof in which the customary semicircular bearing 14 is placed. Bolts 16 having male threads 18 thereon are placed in opposed smooth bores 19 which extend through flanges 20 projecting from the sides of concaved portion 12.

The tool of the instant invention is generally indicated at 21 and comprises an elongated slender generally cylindrical body 22 defining a handle which for convenience and safety has a rounded end 24. The upper end 26 of the body 22 is cut on a plane substantially perpendicular to the longitudinal axis thereof. A large smooth bore 28 is formed in coaxial relation with the longitudinal axis of handle 22. An annular ring 30 of material is thus formed by the cylindrical nature of the handle and the bore 28 therein which is of a thickness such that it will compress and retain the bearing 14 when assembled as pointed out hereinafter. It has been found that the formation of a bore 28 about one-half the diameter of handle 22 will suffice for most size connecting rods and will provide sufficient material to provide an annular ring 30 of appropriate strength. A smaller coaxial opening 32, internally threaded as at 33, extends from the lower portion of bore 28. The relationship of the bore 28 and the threaded opening 32 is of particular significance in that the bolt 16 need not be extensively threaded into opening 32 since the connection made is to be temporary. The smooth bore 28 serves as a guide to insure that the connection is not cross-threaded.

After the piston 5, connecting rod 8, bearing 14, and bolts 16 have been assembled in the positions shown in FIGURE 1, the handle 22 is so positioned that the bolt 16 is introduced into the large bore 28. Handle 22 is then rotated until threads 18 of bolt 16 engage threads 33 of opening 32. One tool 21 is engaged with each of the bolts 16.

As seen in FIGURE 1, annular rings 30 of the tools 21 engage over the ends of bearing 14 to secure the same in position on the concaved portion 12 of connecting rod 8 but do not extend toward the center of the assembly beyond the inner edge 15 of the bearing 14. Thus the shape of the tool 21 is such that an unobstructed entry is provided for the placement of the inner surface of the bearing 14 over the crankshaft 4. This entry is in the plane of connecting rod 8 and the bores 19 on each flange 20.

After the preassembled unit comprising piston 5, connecting rod 8, bearing 14, and bolts 16 has been placed on crankshaft 4, the tools 21 are unscrewed from bolts 16 and the customary lower half of the connecting rod bearing and connecting rod is placed against the bottom of the crankshaft. A nut is firmly attached to the threads of each bolt.

To disassemble the unit the procedure is obviously reversed. After the lower half of the connecting rod bottom portion and the lower crankshaft bearing are removed, a tool 21 is screwed onto each bolt with the annular ring 30 firmly holding bearing 14 in place for convenient removal.

The tool of the instant invention may be made of any suitable material softer than the crankshaft, e.g., aluminum, plastic, pewter, or pot metal, in order to preclude scratching or marring the crankshaft or bearing during assembly and disassembly.

The instant invention may obviously be made in any desired size, and the specific form of the handle may be varied according to the construction of the individual units with which it is employed and may be advantageously utilized in conjunction with any size or type diesel or gasoline engine.

From the foregoing it will now be seen that there is herein provided an improved tool for assembling and disassembling pistons which accomplished all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted as illustrative and not in a limiting sense.

I claim:

1. In a preassembled piston rod and piston combination of the type having a piston secured at one end of a piston rod, the other end of the piston rod being bifurcated and having formed therein a concave bearing member receiving portion, and a removable bearing member received in said concave portion, said piston rod including means defining apertures adjacent the ends of the concave portion, the improvement comprising:
   a pair of threaded bolt means extending through said apertures; and
   a pair of elongated tool means having a threaded opening in at least one end received on said bolts and extending toward each other to engage only the ends of said bearing member to secure said bearing member in said concave portion while said bearing member is being fitted on a crankshaft.

2. The invention of claim 1 wherein:
   said tool means further includes a nonthreaded portion in said opening adjacent the end of said tool.

References Cited by the Examiner

UNITED STATES PATENTS

| | | | |
|---|---|---|---|
| 506,245 | 10/1893 | Miller | 145—112 |
| 555,300 | 2/1896 | Browne | 85—35 X |
| 600,906 | 3/1898 | Chimgar | 145—112 |
| 1,352,311 | 9/1920 | Peyer | 33—180 |
| 1,496,270 | 6/1924 | Jones | 33—180 |
| 2,609,208 | 9/1952 | Brooks | 33—180 X |
| 2,826,806 | 3/1958 | McDonald | 29—271 |

FOREIGN PATENTS 161,353   2/1955   Australia.

WILLIAM FELDMAN, *Primary Examiner.*

M. C. KRUSE, *Examiner.*